United States Patent [19]

MacDoran et al.

[11] Patent Number: 5,347,285
[45] Date of Patent: Sep. 13, 1994

[54] METHOD AND APPARATUS FOR TRACKING THE POSITION AND VELOCITY OF AIRBORNE INSTRUMENTATION

[75] Inventors: Peter F. MacDoran; David B. Call, both of Boulder; Kenneth L. Gold, Boone, all of Colo.

[73] Assignee: A.I.R., Inc., Boulder, Colo.

[21] Appl. No.: 898,948

[22] Filed: Jun. 15, 1992

[51] Int. Cl.[5] .......................... H04B 7/185; G01S 5/02
[52] U.S. Cl. .................... 342/357; 342/463; 342/352
[58] Field of Search ............... 342/357, 352, 450, 453, 342/463, 464, 465; 375/1

[56] References Cited

U.S. PATENT DOCUMENTS

| | | | |
|---|---|---|---|
| 4,809,005 | 2/1989 | Counselman, III | 342/352 |
| 4,812,991 | 3/1989 | Hatch | 364/458 |
| 4,894,662 | 1/1990 | Counselman | 342/357 |
| 4,918,609 | 4/1990 | Yamawaki | 364/449 |
| 5,006,855 | 4/1991 | Braff | 342/357 |
| 5,017,926 | 5/1991 | Ames et al. | 342/353 |
| 5,025,261 | 6/1991 | Ohta et al. | 342/357 |
| 5,030,957 | 7/1991 | Evans | 342/357 |
| 5,041,833 | 8/1991 | Weinberg | 342/357 |
| 5,045,861 | 9/1991 | Duffett-Smith | 342/457 |
| 5,097,269 | 3/1992 | Takayama et al. | 342/453 |
| 5,126,748 | 6/1992 | Ames et al. | 342/353 |

OTHER PUBLICATIONS

MacDoran, P. F. et al, "Codeless GPS Systems for Positioning of Offshore Platforms and 3D Seismic Surveys", Navigation: Journal of The Institute of Navigation, vol. 31, No. 2, 1984, pp. 57–69.

*Primary Examiner*—John B. Sotomayor
*Attorney, Agent, or Firm*—John E. Reilly

[57] ABSTRACT

A method and system for tracking the position of at least one moving object, such as, an airborne meteorological instrument from a ground processing station by intercepting wideband spread spectrum signals transmitted from a plurality of satellites in which the code sequence of the signals is not known comprises a receiver circuit in the moving object which compresses the wideband signals received into a narrow band, removes any frequency bias with a reference oscillator having a frequency offset value, forms a narrow analog base-band and transmits to the processing station at which spectral lines are produced and compared with synthetic spectrum values to determine the identity of each satellite, the reference oscillator frequency offset value is estimated, and the location and velocity of the moving object is determined.

20 Claims, 4 Drawing Sheets

METHOD AND APPARATUS FOR TRACKING THE POSITION AND VELOCITY OF AIRBORNE INSTRUMENTATION

CROSS REFERENCE TO MICROFICHE APPENDIX

Reference is made to the Microfiche Appendix entitled "Method/Apparatus for Tracking Position and Velocity of Airborne Instrument" by Peter F. MacDoran et al.

This invention relates to a novel and improved method and apparatus for tracking the position and velocity of a moving object; and more particularly relates to a novel and improved method and apparatus for tracking the position and velocity of airborne devices, such as, airborne weather instrumentation from a processing station remote from the devices.

BACKGROUND AND FIELD OF THE INVENTION

The NAVSTAR Global Positioning System of the U.S. Air Force are made up of a plurality of Earth-orbiting, signal-transmitting satellites which transmit spread spectrum signals in accordance with a predetermined code. "NAVSTAR: Global Positioning System—Ten Years Later", B. W. Parkinson and S. W. Gilbert, Proc. IEEE, Vol. 71, October, 1983. In U.S. Pat. No. 4,797,677 to MacDoran et al, a system is disclosed for deriving pseudo range without knowledge of the code sequence of modulation carried by the signals. However, that system as devised was not concerned with the problem of tracking both the velocity and position of a moving object without knowledge of the code sequence of the satellites. For instance, it is highly desirable to be able to measure weather balloon velocity using an expendable, built-in global positioning system receiver and to be able to process signals at a ground station without knowledge of the pseudo random noise codes used by the GPS satellites and wherein the object to be tracked can include an inexpensive receiver which is capable of receiving signals from the satellites and transmitting either alone or in combination with other data to a central processing station. Specifically, it is desirable to be able to employ a very inexpensive reference oscillator on board the expendable receiver; or, in other words, an oscillator which is not necessarily accurate or highly stable. In this relation, it is important to be able to manage the effects of the receiver's instantaneous velocity vector projections onto the lines of sight to the individual GPS satellites that results in a Doppler shift to those particular GPS observations; and further to manage the effects of the kinematics of the receiver that results in a change of the spread spectrum signals induced by the change of geodetic location as the receiver moves between different locations.

In aforementioned U.S. Pat. No. 4,797,677, there were both explicit and implicit assumptions regarding the accuracy and stability of the reference oscillator utilized to accomplish the final down-conversion to baseband of the compressed spectrum obtained from non-linear operations on the spread spectrum signals; i.e., delay and multiply. The oscillators employed were relatively expensive, making them unsuitable for use in an airborne or other expendable receiver, such as, for example, for use as a part of an expendable airborne weather instrument. Moreover, the weight and power requirements of the more expensive oscillators made them entirely unsuitable for launch in a light-weight receiver.

It is therefore important to provide a system in which a light-weight, low cost oscillator may be incorporated into an expendable receiver, even though the accuracy and stability of the oscillator is on the order of 0.001% (10 PPM). This implies that at the reference frequency of 10.2298 MHz the actual frequency being generated is in error by approximately 100 Hz. The baseband signal bandwidth that contain the observations to be eventually processed into velocity and positioning information are essentially contained within ±27 Hz for a static Earth-based observer exploiting the P channel, which has a chipping code frequency of 10.23 MHz. However, where the mission is to track a moving object or receiver which may be moving at speeds of up to 200 m/sec the spectral lines extracted from the delay and multiple operation in the receivers or spectral compressor, may be at many possible spectral positions. Where the reference frequency may be off as much as 100 Hz, the spectral line ensemble, resulting from each satellite in view, may shift either to higher or lower frequencies by as much as 100 Hz. A further consideration is the shift in spectral line positions, for example, a 200 m/s motion of the receiver directly toward or away from a particular satellite would cause up to 6.8 Hz of additional Doppler shift which would be imposed onto a line of sight to the satellite. A still further consideration is the distance of the receiver away from the processing station. For example, for a P channel chipping frequency of 10.23 MHz for the GPS, the sensitivity to positional changes may be as much as 5 milliHertz per km and which for a 200 km separation may cause the spectral lines to shift by 1.0 Hz.

From the foregoing, it is possible to establish the rationale for determining the down conversion frequency to be used in the GPS receiver; namely, a crystal oscillator offset at 10 PPM at nominal 10 MHz:100 Hz; nominal Doppler shifts along GPS/receiver path ±27 Hz; receiver wind-induced Doppler shift (<200 m/sec.); 6.8 Hz; and receiver positional sensitivity (<200 km range):1.0 Hz. The dominant effects on the chipping frequency spectral line position are from the 10 MHz crystal oscillator in the receiver followed by the combined Doppler effects from the GPS satellites and wind velocity, and the least influential effect is from the actual position of the receiver. The sum of the worst case combination of these tolerances is 134.0 Hz. A further requirement is that the spectral lines remain on the same side of the zero frequency for ease of processing. Assuming that the center frequency of the compressed baseband is placed at 200 Hz, the negative tolerance of 134 Hz makes it necessary to process a band extending from 66 Hz to 334 Hz. An oscillator of 10 PPM accuracy can be specified no more closely than 100 Hz and accordingly the specification of the frequency should be 10.2298 MHz which will result in placing the spectral lines at a center frequency of 200 Hz, assuming that the oscillator has no offset.

SUMMARY OF THE INVENTION

It is therefore an object of the present invention to provide for a novel and improved method and apparatus for tracking the position and velocity of one or more stationary or moving objects.

It is another object of the present invention to track the position and velocity of moving objects utilizing inexpensive, expendable receivers to intercept spread spectrum signals from a plurality of Earth-orbiting satellites without knowledge of the code sequence used by the satellites.

It is a further object of the present invention to provide in a system of the type described for a central processing station capable of tracking objects moving at high speeds, i.e., without knowledge of the satellite codes and from cross linked radio signals transmitted from an expendable receiver incorporating a low cost reference oscillator and which is capable of tolerating substantial shifts in down conversion frequency of the signals received from the moving objects.

In accordance with the present invention, there has been devised a method for tracking the position of at least one moving object from a processing station wherein a receiver in each of the moving objects intercepts wideband spread spectrum signals transmitted from a plurality of satellites passing above the horizon without knowledge of the code sequence of the satellites, the method comprising the steps of compressing the wideband signals received from the satellites into a narrow band by a ratio of at least 100:1, removing any frequency bias with a reference oscillator having a frequency offset value which will prevent the base-band from passing into a negative frequency space, forming a narrow analog baseband comprised of sine wave superpositions, transmitting the baseband to the processing station and producing a digital representation of the sine wave superpositions at the processing station, processing the digital representations to produce spectral lines composed of amplitude, frequency and phase values, generating a synthetic spectrum including a frequency offset value corresponding to the frequency offset value of the reference oscillator based on approximate location and velocity of the satellites and converting to digital synthetic values representative of the spectrum, comparing the spectral lines with the digital synthetic spectrum values to determine the identity of each satellite corresponding to each spectral line, and estimating the reference oscillator frequency offset value and then determining the location and velocity of each moving object.

The preferred form of invention is further characterized by multiplying in-phase and delayed path signals and compressing the band of the signals into a width of 70 Hz with a center frequency of 10.23 MHz, and the reference oscillator is a 10.2298 MHz crystal oscillator. Accordingly, the frequency offset value of the synthetic spectrum corresponds to that of the reference oscillator, and in comparing the spectral lines with the digital synthetic spectrum value, the actual down conversion of the frequency offset value of the reference oscillator is determined.

The above and other objects of the present invention will become more readily appreciated and understood from a consideration of the following detailed description of a preferred embodiment when taken together with the accompanying drawings wherein:

DETAILED DESCRIPTION OF THE PREFERRED EMBODIMENT

Figure 1:
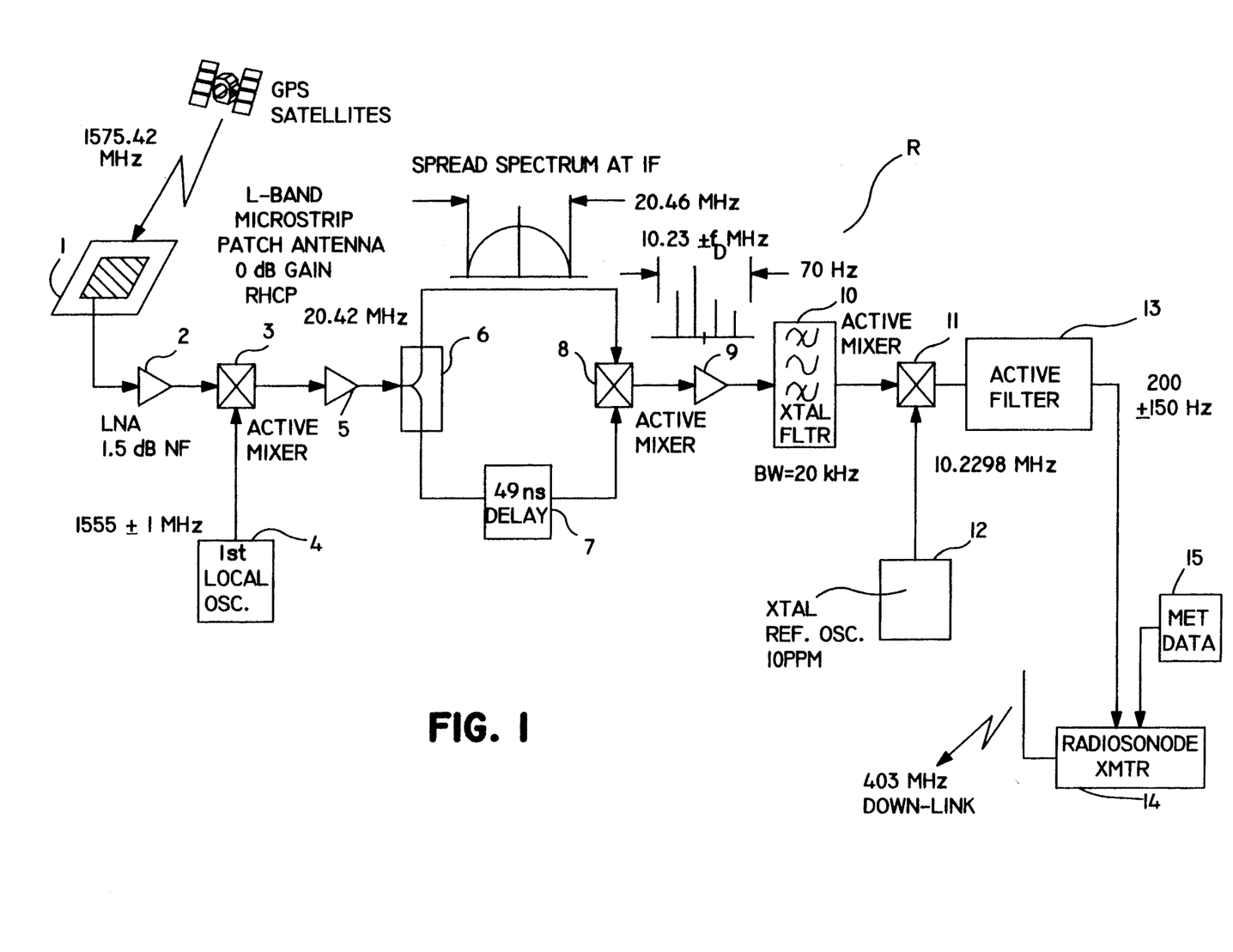
FIG. 1 is a schematic diagram of the preferred form of receiver circuit incorporated into a radiosonde weather instrument.

In FIG. 1, spread spectrum signals from the GPS satellites which are above the horizon arrive at the GPS sonde L-band microstrip patch antenna 1 in an airborne weather instrument which contains an expendable receiver circuit designated at R. A preferred form of weather instrument is the radiosonde Model 20, hereinafter referred to as the GPS sonde, manufactured and sold by A.I.R., Inc. of Boulder, Colo. and which in addition to the receiver circuit R includes the necessary instrumentation to transmit meteorological data to a ground processing station, such as, that illustrated in FIG. 2 and to be hereinafter described. The choice of the microstrip patch is motivated by its potential low cost in fabrication and its inherent narrow bandpass characteristics, typically 1% of the R.F. frequency (15.7 MHz at the L1 frequency of 1575.42 MHz). Antenna 1 is configured for right hand circular polarization (RHCP) and is assumed to have no appreciable gain (0 dB). Element 2 of the system is a low noise amplifier (LNA) with a gain of 20 dB and a noise figure (N.F.) of 1.5 dB which is equivalent to 122 Kelvins of noise temperature. An active double balanced mixer 3 having a conversion gain of 8 dB is driven by a free running first local oscillator 4 operating at 1555 MHz±1 MHz. Ideally, local oscillator 4 would be 1554.96 MHz so that the following intermediate frequency stage would be 20.46 MHz; however, since the preferred implementation uses a low cost first local oscillator 4 while still holding a frequency accuracy of 1 MHz at 1555 MHz, it is not reasonable to specify the first local oscillator frequency with a precision of 10 kHz if the inherent accuracy of the oscillator is only 1 MHz. The stability requirement for the first local oscillator 4 derives from the requirement that a majority of the spread spectrum signal power from the GPS satellites arrives within the first intermediate amplifier bandpass 5 of the receiver R. The width of the P channel spread spectrum signal is 20.46 MHz between the first nulls. Following the mixer 3 is the first intermediate frequency amplifier 5 at a center frequency of 20.42 MHz. The bandwidth of the first intermediate frequency is 20 MHz so as to pass the entire central lobe of the spread spectrum. The output of the first intermediate frequency amplifier 5 is input to a power divider 6 which sends an equal amount of intermediate frequency power along two paths leading to an active mixer 8. The diagram above power divider 6 illustrates the signal spectrum shape which is centered at 20.42 MHz with a width of 20.46 MHz.

The choice of the center frequency of the first intermediate frequency is not arbitrary but is dictated by the delay and multiply technique which is used to recover the 10.23 MHz chipping rate used to create the spread spectrum of the GPS signal. To maximize the chipping frequency signal recovery, it is necessary to delay one signal path, as designated by delay circuit 7, by an amount of time equal to one-half of the P channel chip period, or 49 nanoseconds. In FIG. 1, there is shown a lumped element delay 7; however, a 10 meter length of coaxial cable, assuming a 0.7 velocity factor for the cable, could also serve the same function or a filter composed of passive elements of inductors and capacitors can also perform this function. The frequency corresponding to a period of 49 nanoseconds is 20.42 MHz.

Thus, the time delayed path through the delay 7 is phase-shifted by one full wavelength at the first I.F. amplifier frequency of 20.42 MHz.

An active mixer 8 multiplies the in-phase and delayed path signals which has the effect of compressing the spectrum into a width of 70 Hz with a center frequency of 10.23 MHz. A discussion of the compressional property of this operation is given in said U.S. Pat. No. 4,797,677. The control of that 10.23 MHz signal is governed by the atomic oscillators within the GPS satellites and is not a function of the first local oscillator frequency within the expendable receiver. As previously discussed, one and only one spectral line is created by each satellite because of the maximal length code structure of the pseudo random noise (PRN) signals that have a very low cross-correlation product between the satellites, and thus the intermodulation products do not exist. "GPS Signal Structure and Performance Characteristics", J. J. Spilker, Navigation, Institute of Navigation, ISBN 0-0936406-00-3, Vol. No. 2, Summer, 1978.

Following the mixer 8 is a second intermediate frequency amplifier 9 whose output is directed into a crystal filter 10, tuned to a center frequency of 10.23 MHz with a bandwidth of 20 kHz although the physics band of interest is only 70 Hz wide. Depending on cost and performance requirements, a simpler lumped element filter can be used in place of the crystal filter 10. Active mixer 11 is driven by a crystal reference oscillator 12 having an accuracy of 10 PPM at a frequency of 10.2298 MHz. This second local oscillator 12 is important in that the frequency at which the second local oscillator is actually running will become a solved-for parameter in the final estimation procedure which will be carried out by the central processor subsystem, usually located on the ground. The primary function of the second local oscillator is to remove the frequency bias that contains no physical information, leaving only the small bandwidth of 70 Hz to be transmitted to the central site processor.

Because of the possibility that the reference oscillator 12 would drift to its 10 PPM limit (100 Hz), a 200 Hz bias is chosen to prevent the spectral lines from going into a negative frequency space. An active filter provides a cutoff for frequencies above 350 Hz and amplifies a band of $200\pm150$ Hz. The output of active filter 13 is at a level of $\pm13$ dBm (1 V rms at 50 Ohms) and is used to modulate the radiosonde transmitter 14 downlink at 403 MHz, or may be at 1680 MHz, together with the usual meteorological data from sensors in diagram block 15.

Figure 2:
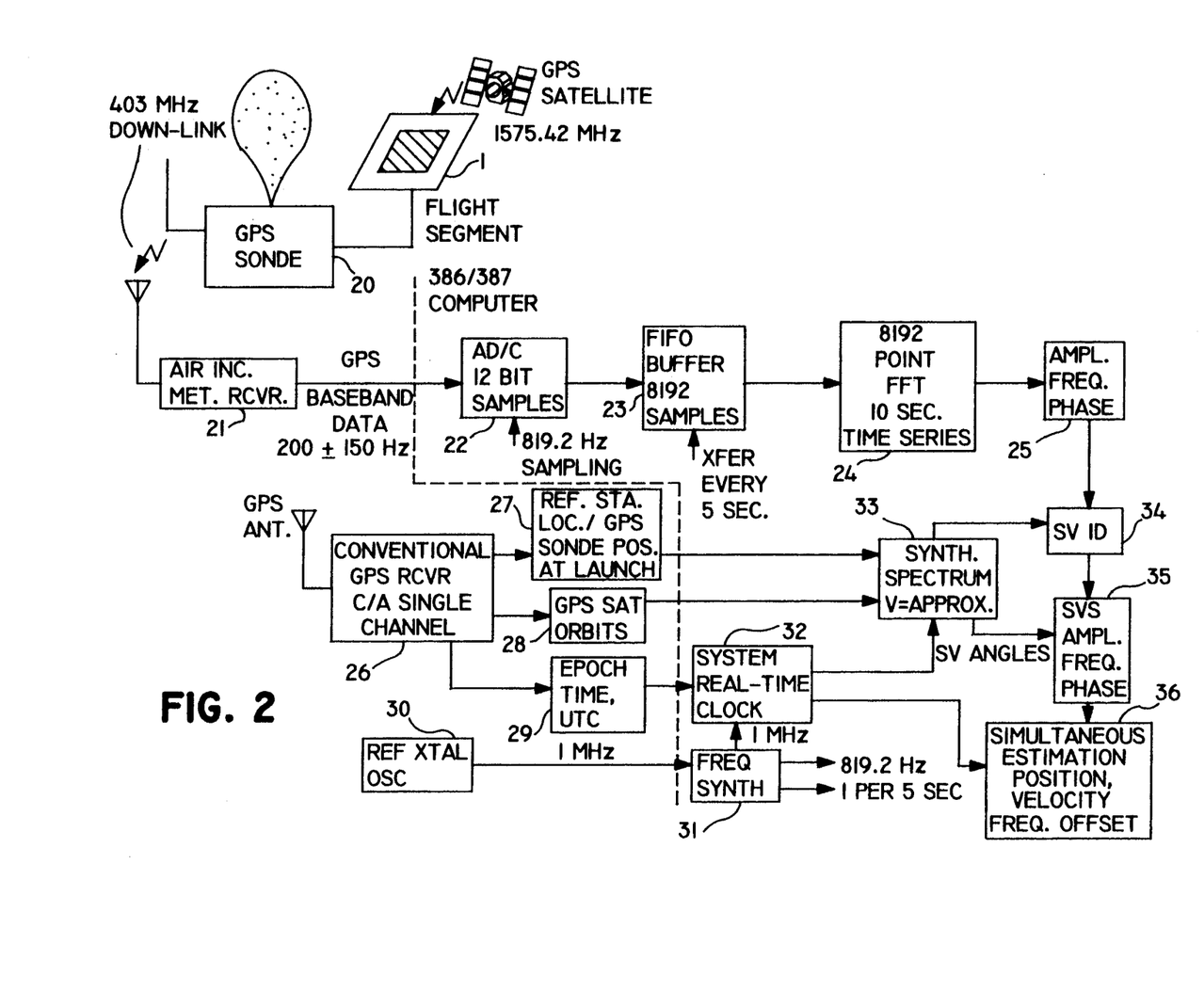
FIG. 2 is a block diagram of a preferred form of ground processing station for processing signals received from the radiosonde of FIG. 1.

In FIG. 2, the GPS sonde 20 is shown transmitting its compressed band GPS signals to the ground segment processor. A meteorological receiver 21 extracts the GPS baseband data ($200\pm150$ Hz) from the cross-linked signal. For example, the receiver 21 may be a modified 403 MHz receiver manufactured and sold by A.I.R., Inc. of Boulder, Colo. The data processing functions are performed by a specially configured 80386/80387 computer architecture.

In the ground segment, the processing begins with an input to an analog-to-digital converter (AD/C) component 22 which performs a 12 bit sampling of the waveform at a rate of 819.2 Hz. The choice of 819.2 Hz is governed by the need to adequately sample the 350 Hz physics band from the GPS sonde 20. The 819.2 Hz rate is 17% above the minimal rate of 700 Hz of the Nyquist sampling criterion. A first in/first out (FIFO) buffer 23 with a capacity of 8192 samples holds 10 seconds of output from the AD/C 22. Every five seconds, the contents of the buffer 23 are transferred to a Fast Fourier Transform (FFT) processor 24 that operates on the 8192 sample points, representing ten seconds of time. The output of the FFT stage 24 is a discrete frequency spectrum composed of amplitude, frequency and phase values for the entire 350 Hz bandwidth of the received channel from the GPS sonde. The FFT 24 may be implemented in either software or firmware and derives its phase information from an arc tangent operation on the in-phase divided by quadrature amplitude ratios. Since the buffer transfers its contents every five seconds, the FFT 24 has a 50% overlap with the previous buffer contents and allows phase connection between buffer intervals and significantly increases the frequency measurement precision potential.

As an example, within the ten-second interval of the individual FFT 24, the resultant frequency bin resolution is 0.1 Hz. By using the connected phase algorithm over a ten-second interval 71 as hereinafter described, it is possible to estimate the actual frequency of the input signal to an accuracy of 0.004 Hz. The FFT operates every five seconds and given a frequency certainty for an individual spectral line of 0.004 Hz, the phase will be uncertain by 5 seconds$\times$0.004 cycles/second=0.02 cycle. This phase is well within the 0.16 cycle criterion needed in order to perform phase connection between adjacent and overlapping time series intervals. Given 12 FFT estimates of amplitude, frequency and phase every minute, a least squares quadratic, or higher order if necessary, fit to the phase data can be performed at a predetermined rate that will account for the frequency drift of the oscillator 12 in the GPS sonde flight segment. Given an FFT signal detection threshold of 4, the equivalent phase noise will be 0.25 radians (0.04 cycle). The aggregate precision of the frequency measurement over a one minute interval will be 0.04 cycle/60 seconds=$7\times10^{-4}$ Hz=2 cm/second in velocity measurement precision.

An important feature of this invention is the ability to identify each of the individual satellite signals arriving at the location of the GPS sonde without explicit code use. However, where more extensive GPS information, e.g., satellite orbits is required, a conventional GPS receiver 26b is provided. One suitable form of receiver is the Trimble Trimpack Part No. 13498, manufactured and sold by Trimble Navigation, Limited of Sunnyvale, Calif. with its own GPS antenna. This C/A receiver will provide three components of information to the central processor system: (1) the location consisting of latitude, longitude and height of element 27 of the ground segment processor; (2) the GPS satellite orbital elements 28 in which the almanac and the precision elements are output; and (3) an approximate epoch time 29 which is Universal Time Coordinated and is needed to an accuracy of only 0.1 second to meet the requirements of 10 meter differential positioning accuracy for a 200 km separation between the GPS sonde and the processor site. In order to establish a real-time clock for the system and synthesize special frequencies, a reference oscillator 30 is provided. The reference oscillator 30 has an output of 1 MHz and is more accurate on the order of 1 PPM or better than the low cost oscillator aboard the GPS sonde 20. This reference 1 MHz is used as an input to the frequency synthesizer 31 which creates two outputs, 819.2 Hz which is used as the sampling frequency of the analog-to-digital converter 22 and a once-per-five-second pulse which transfers the contents of the FIFO buffer 23 to the FFT processor 24. The 1 MHz reference oscillator signal also drives the system real-time clock 32. The epoch time 29 is used to set the system clock 32.

In order to proceed to identify which satellites are being received, it is necessary to generate a synthetic spectrum 33 which requires various input information. The required inputs are the approximate location of the ground segment 27 which launched the GPS sonde, the GPS satellite orbital elements 28 to predict which of the perhaps twenty-four possible GPS satellites are likely to be in view of the sonde and the system time (UTC) supplied by 32. The software of element 33 inputs a velocity estimate which will initially be zero. Once an approximation of the spectrum is available, a comparison is performed within module 34 that establishes which of all the possible satellites is actually being received at the location of the GPS sonde performed in subroutine 55 to 57 and 60 to 70, inclusive in FIG. 3. It now is possible to form a set of observational vectors that have a unique correspondence between each spectral line with a specific satellite with its amplitude, frequency and phase module 35. The contents of module 35 form the raw observations for the final operation which is a simultaneous estimation processor 36, such as, a Householder Transformation, that evaluates the velocity components and the frequency offset term of the crystal reference oscillator 12 in the GPS sonde 20.

Figure 3A:
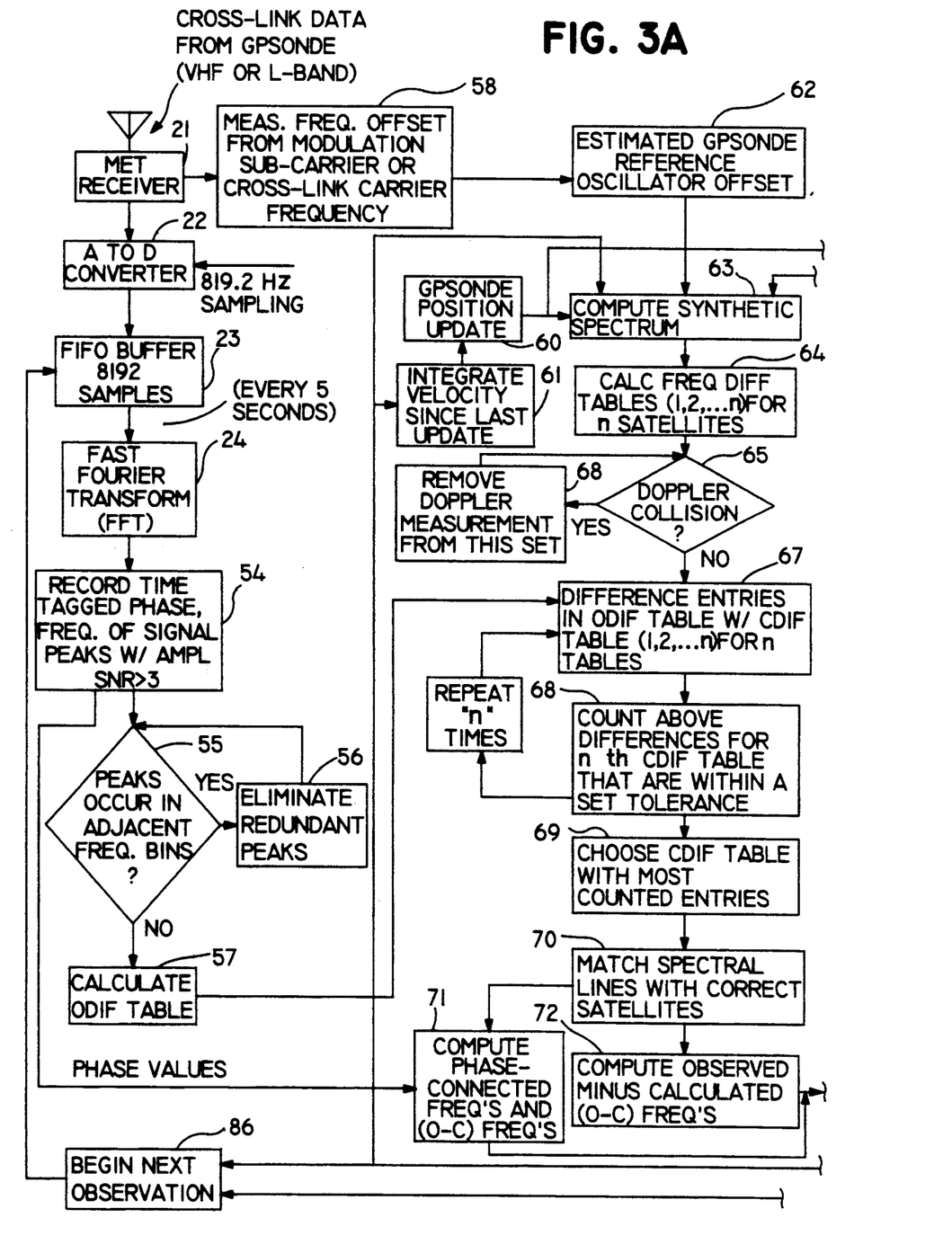
FIGS. 3a and 3b are flow diagrams of the software employed in the ground processing station of FIG. 2.
Figure 3B:
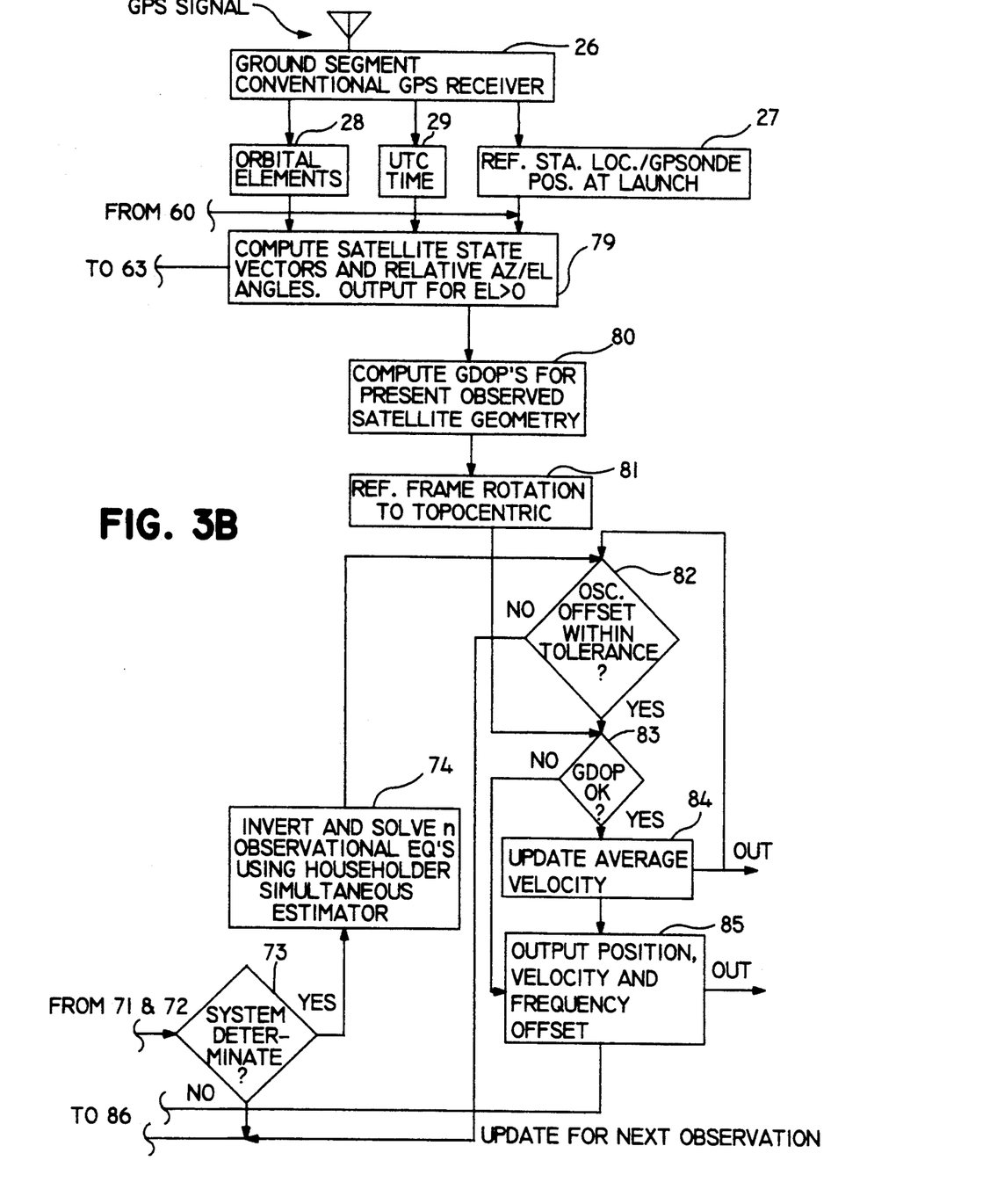

The typical down-link for the GPS sonde 20 is a VHF frequency of approximately 403 MHz or an L-band frequency of 1680 MHz. As shown in FIG. 3, that down-link is received by the AIR meteorological data receiver 50 which has a coherent heterodyn conversion to an intermediate frequency. At the intermediate frequency stage, there is a phase locked loop that allows the carrier frequency to be measured using an electronic counter 58. Because the down-link frequency from the GPS sonde can be synthesized from the 10.2298 MHz reference oscillator in the GPS sonde, the measurement of carrier frequency gives a direct measure of the present actual frequency at which the 10.2298 MHz GPS sonde oscillator is operating. It is also possible to create a sub-carrier signal derived from the reference oscillator (i.e., by a divide 10,000 to yield 1022.98 Hz) onto which the GPS could be modulated. By extracting the 1 kHz sub-carrier and measuring the actual frequency to within 0.001 Hz accuracy it is possible to determine the GPS sonde reference frequency with 1 PPM accuracy designated at 58 in FIG. 3.

The analog data channels output from the meteorological receiver contain a GPS channel consisting of the compressed band data from the expendable receiver. As noted earlier, the sonde analog signal is input to the analog-to-digital converter 22 which is sampled at a rate of 819.2 Hz. The resulting digital data stream is buffered in blocks of 8192 samples, which forms a ten-second time series and is transferred every five seconds. The data is processed in blocks of ten seconds which are transferred from the First In/First Out (FIFO) storage buffer 23 every five seconds into the Fast Fourier Transform processor 24. Thus, each ten-second block of the time series consists of the last five seconds of the previous ten-second series plus five seconds of new data, assuring phase continuity across the entire time series. Again, the output of the FFT processor 24 is an array of values in frequency space consisting of an amplitude and phase for each frequency bin position. The detection of relative peaks in amplitude in this array is determined by exceeding a threshold value of signal-to-noise ratio at certain frequency locations or bins 54. In certain situations, peaks may occur in adjacent frequency bins due to a spreading of the power at those frequencies. When this occurs, the peak representing the greatest signal-to-noise ratio of all the adjacent peaks is retained and the adjacent bin values are ignored, as illustrated in blocks 55 and 56. The resulting array contains the peak amplitude and the frequency for each observed spectral line signal representing the observed Doppler shifted frequencies of the GPS satellites. This information forms the basis for the subsequent calculations of velocity and position of the GPS sonde.

Each observed frequency peak must be matched to the individual GPS satellite for which the spectral line signal is its source. Therefore, knowledge of the relative geometry of the GPS sonde 20 and visible GPS satellites is required. The approximate a priori position and velocity information for the GPS sonde is derived from the latitude, longitude and height coordinates in the World Geodetic System WGS-84 coordinate system, "Guide to GPS Positioning", D. Wells et al, Canadian GPS Associates, Fredericton, New Brunswick, Canada, May, 1987, obtained from the conventional GPS C/A code correlating receiver 26 at the site of the GPS sonde launch. Those geodetic data are rotated into the X, Y and Z Cartesian coordinates as shown at block 80 in FIG. 3. Position updates 60 are then performed by integrating the previous velocity measurements 85.

The state vector, position and velocity in Cartesian coordinates of each satellite is then computed. The conventional C/A code-correlating GPS receiver at the ground segment 75 extracts the 50 bit-per-second telemetry message broadcast by each of the satellites. Specifically of interest are the GPS satellite orbital elements 28, the Universal Time Coordinated 29 and the geodetic position of the ground segment processor 27 site from which the GPS sonde is presumably launched. The accuracy of each of these quantities will now be examined.

The accuracy to which the UTC epoch time is to be known is rather modest. For example, if it is desired to measure the velocity of the sonde 20 to an accuracy of one nautical mile per hour (50 cm/s), then it is required to know the time at which to evaluate the satellite orbit elements in order to correctly estimate the individual satellite Doppler frequency shift projected on the line of sight. The maximum rate of change of the Doppler shift occurs at the time of closest approach of the satellite relative to the receiver. During that event, the P channel chipping frequency has a rate of change of 6.5 mHz per second. There is an equivalence of frequency to speed which is scaled by wavelength. For the P channel chipping frequency of 10.23 MHz the equivalent wavelength is 29.3 meters which corresponds to 29.3 m/s per Hertz or 2.93 cm/s per mHz. The sensitivity of velocity measurement accuracy to epoch time error then becomes 6.5 mHz/s $\times$ 2.9 cm/s/mHz = 19 cm/s per second of epoch time error. Since it is rather easy to achieve much better than 0.1 second time synchronization at the processor site, the satellite error-induced Doppler shift is estimated to be much smaller than 2 cm/s and contributes a small error to the goal of velocity measurement of 50 cm/s accuracy.

The accuracy to which the satellite orbits must be known can also be assessed by the influence that such an error will have on the maximum rate of change of the Doppler shift. The period of the GPS circular orbits is nearly twelve hours and the radius of the orbit is 26,500 km. Therefore, the along-track velocity of the GPS satellites is 3.86 km/s. An orbit error equivalent to 3.8 km is therefore equivalent to a one-second timing error which has been shown to contribute a 19 cm/s velocity error. If the orbit portion of the total error budget allowed was 30 cm/s then the tolerable orbit error would be 6 km. This is a maximum sensitivity value, and all the satellites would not be at geometries that would cause maximum sensitivity since that would imply very poor geometric dilution of precision (GDOP) conditions. At present, the quality of the broadcast orbits is 10 m to 20 m. However, under conditions that are consistent with the government DOD selective availability (SA) policy that supports positioning of accuracy of 100 meters 2-d RMS, the orbit accuracy is approximately 120 meters. Federal Radionavigation Plan, BOD-4650.4, BOT-TSC-RSPA-84-8, Department of Transportation, 1984. The GPS almanac class true Keplerian orbit elements are accurate to a few km even after many days.

The accuracy of the launch geodetic position is also rather modest. The partial derivative sensitivity of the measured Doppler frequency to position has a maximum of 5 mHz/km which is equal to 15 cm/s/km. Thus, a 2 km geodetic error has a maximum effect of 30 cm/s. An ordinary map can supply the necessary accuracy to support GPS sonde operations. A U.S. Geological Survey quadrilateral chart of 1:20,000 scale can provide locations to 20 m given identification of the launch site with a 1 mm map location accuracy.

Once the orbital elements 28 for the satellite constellation are available, the satellites that are potentially visible with elevation angles greater than 0° are identified. All coordinates for these satellites are now rotated from the inertial J2000 System, "GPS Satellite Surveying, Inc.", A. Lieck, published by Don Wiley & sons, 1990, into the Earth-fixed topocentric WGS-84 reference frame. From information about the receiver and satellite positions, a direction vector is calculated between the GPS sonde and each GPS satellite as indicated at block 79.

The procedure for matching the observed signal peaks to their respective satellite sources consists of the following steps: Based upon the satellites' expected geometry relative to the GPS sonde, line of sight velocities, and hence, expected Doppler shifts are computed. The expected expendable reference oscillator's frequency offset is derived either from the measured offset of the cross-link carrier 58, 62 or from the previous parameter solution of input estimated at block 85 in order to compute the synthetic spectrum at 63. This calculation results in the assignment of a synthetic, expected peak to a frequency position in the synthetic spectrum 63 for each of the potentially visible satellites. Each peak is representative of the expected Doppler shifted frequency of the received signals. The observed frequencies, as obtained from the FFT processor 24, are the basis for the observable difference table 57. This table is formed using the strongest observed peak at 55 in terms of signal-to-noise ratio as a reference and then computing the difference in frequency space between it and all other observed peaks while eliminating redundant peaks at 56. Similar sets of differences are calculated for the synthetic spectrum 63 using each peak, in turn, as a reference to form a difference set 64. For n potentially visible satellites, there will be n sets 64 with n−1 differences. Finally, each set 64 is compared with the set 57. The set 64 that has the most matches to the observed values designates the proper spectrum, as calculated in blocks 65–68. This is, in essence, a majority vote function as at block 69. The final step in this matching process is assigning each of the observed peaks to a satellite as represented at block 70. This is achieved by recovering the individual and reference identification of the satellites used to generate elements of the table 64 that match the observed differences. Occasionally, matched peaks are located closely, if not superimposed, due to similar Doppler shifts on different GPS satellites as seen by the GPS sonde. This Doppler collision is dealt with at 65 and 66 either by temporarily deleting the two satellites in conflict or using a more sophisticated signal-detection algorithm that has greater frequency resolution. Such a greater resolution method can be achieved by phase-tracking the signals over an interval that is extended over longer intervals than the ten seconds of the FFT method that achieves 0.1 Hz frequency bin widths. By phase-tracking individual satellites every five seconds over a 100-second interval with phase noise of 0.01 cycle, it is possible to attain an equivalent bin width of 0.1 mHz which basically eliminates the Doppler collision problem.

Once the satellites are properly matched to observed frequencies, the resulting array is tested to verify that a sufficient number of observations are present to solve the system of equations at 73. The system of equations is derived from the following frequency relationships: Each spectral line derived in the FFT is offset from a common center frequency which is unknown and will be estimated. This offset is comprised of the Doppler shift in the received signal due to (1) the line-of-sight velocity of the GPS satellite as if the receiver were stationary, (2) the velocity of the GPS sonde along the line-of-sight to the satellites, and (3) the frequency offset of the on-board, expendable reference oscillator.

The expected satellite Doppler term is derived from a nominal instantaneous position for the GPS sonde and an initial condition of zero GPS sonde velocity. An additional Doppler term results from the line-of-sight velocity of the GPS sonde itself. These Doppler terms are decomposed into southern, eastern and vertical components in the topocentric reference frame 81. These three terms comprise three of the unknowns for the system of equations. The fourth unknown is the expendable reference oscillator offset. Each observed signal source presents one equation containing these unknowns. Hence, a minimum of three observations is required for two-dimensional measurements and four observations for three dimensions. If insufficient observations exist, the algorithm does not compute values for this particular set of measurements performed at 73.

A computation of the Dilution of Precision for the geometry existing at every epoch is performed at block 80. A Householder rotation and back substitution are then used to triangularize the observation matrix and solve the equations as at 74. This is equivalent mathematically to a Kalman filter update; however, it has been shown to be more numerically stable. "Factorization Methods for Discrete Sequential Estimation", G. J. Bierman, Vol. 128, Academic Press, 1977. The solution vector is in units of Hertz. The components of this solution vector corresponding to velocities must be multiplied by the received P-code wavelength (29.3052256 m) to achieve a true velocity measurement. Throughout the data acquisition, there is a continuous comparison of the frequency offset term with the previous value 84 in order to predict, within a given specific tolerance, the value of the next frequency offset. If the calculated offset varies from this set tolerance, the corresponding velocity data is flagged at 82 as being unsatisfactory. This procedure is based on an assumption that crystal oscillator drift is likely to be a smooth function and that sudden changes in frequency, (i.e., 0.1 Hz in 5 sec.), are not likely. Such frequency jumps must therefore be indicative of a measurement problem, and calculated values from this epoch are deleted.

If the frequency offset value is within the set tolerance, the velocity is input to the velocity average calculation 84, and the averaging interval can be set to any desired value, 84. Twelve measurements spans one minute. If, however, the corresponding GDOP estimation based upon the actual set of received satellites does not fall within specified limits, (i.e. <3), this one-minute average is not updated and the next data set GDOP estimation is processed at 83.

The information obtained during the processing is archived to the computer mass storage and is simultaneously displayed for the user on the monitor. The monitor output shows the azimuth, elevation and satellite vehicle number of all potentially visible satellites. Satellites which have been actually received are highlighted and the observed signal-to-noise ratio displayed, including a polar plot indicating the relative position of the satellites to the GPS sonde, dilution of precision measurement of the current observed geometry, error messages regarding Doppler collisions (satellite Doppler values too close together to uniquely identify each satellite, i..e, 0.8 Hz), oscillator offset misbehavior, the south, east and vertical velocities, speed and direction and the average speed during a set time interval.

The computer program code, written in the C and the Fortran languages, including that portion which resides in program memory has been deposited with the U.S. Patent and Trademark Office pursuant to 37 C.F.R. §1.96 and is incorporated by reference herein. In FIG. 3, computer function steps are indicated within blocks or rectangles and logic steps or decisions within parallelograms. Once activated, the program as represented by the flow chart in FIG. 3 runs continuously and automatically under the control of the clock 29.

Although the preferred form of invention has been described specifically in connection with the NAVSTAR Global Positioning System, it is readily conformable for use with other Earth-orbiting, signal-transmitting satellites, such as, the Global Navigation Satellite System of the former U.S.S.R., "GLONASS and GPS: Prospects for a Partnership", N. E. Ivanov and V. Salistchev, Publication Reference, GPS World, Vol. 2, No. 4, April, 1991.

It is therefore to be understood that while a preferred form of method and apparatus has been herein set forth and described, various modifications and changes may be made without departing from the spirit and scope of the present invention as defined by the appended claims and reasonable equivalents thereof.

We claim:

1. The method for tracking the position of at least one moving object from a processing station wherein a receiver in each of said moving objects intercepts wideband spread spectrum signals transmitted from a plurality of satellites passing above the horizon, the method comprising the steps of:

(a) compressing said wideband signals received from each said satellite into a narrow band by a ratio of at least 100:1 without knowledge of the code sequence of said wideband signals;

(b) removing frequency bias with a reference oscillator having a frequency offset value whereby to produce a narrow baseband;

(c) forming said narrow baseband so as to be comprised of sine wave superpositions;

(d) transmitting said baseband to said processing station and producing a digital representation of said sine wave superpositions at said processing station;

(e) processing said digital representations to produce spectral lines composed of amplitude, frequency and phase values;

(f) generating a synthetic spectrum including a frequency offset value corresponding to the frequency offset value of said reference oscillator based on approximate location and velocity of said satellites and the moving object and producing digital synthetic spectrum values representative of said spectrum;

(g) comparing said spectral lines with said digital synthetic spectrum values to determine the identity of each said satellite corresponding to each said spectral line; and (h) estimating the reference oscillator frequency offset value in determining the location and velocity of each said moving object.

2. The method according to claim 1, wherein step (a) is further characterized by multiplying in-phase and delayed path signals in compressing the band of the signals into a width of 70 Hz with a center frequency of 10.23 MHz.

3. The method according to claim 1, wherein step (c) is characterized in that said reference oscillator is a 10.2298 MHz crystal oscillator.

4. The method according to claim 1, wherein said frequency offset value in step (f) corresponds to the estimated actual frequency offset value of said reference oscillator.

5. The method according to claim 1, wherein step (e) is further characterized by Fast Fourier Transform processing said digital representations to reproduce said spectral lines.

6. The method according to claim 1, further characterized in step (h) by determining the actual down conversion oscillator frequency offset of said reference oscillator.

7. The method for tracking the position and velocity of an airborne meteorological instrument from a processing station remote from said instrument wherein a receiver in said instrument intercepts wideband spread spectrum signals transmitted from satellites above the horizon, the method comprising:

(a) compressing said wideband spectrum signals received from said satellites into a narrow band on the order of 70 Hz centered at 10.23 MHz;

(b) removing frequency bias with a reference oscillator whereby to produce a narrow baseband that will not pass into a negative frequency space;

(c) forming said narrow baseband of 200±150 Hz comprised of sine wave superpositions;

(d) transmitting said baseband to said processing station and producing a digital representation of said sine wave superpositions at said processing station;

(e) processing said digital representations to produce spectral lines composed of amplitude, frequency and phase values;

(f) generating a synthetic spectrum including a frequency offset value corresponding to the frequency offset value of said reference oscillator based on approximate location and velocity of said visible satellites and converting to digital values representative of said spectrum; and (g) comparing said spectral lines with said digital values to determine the location of said instrument.

8. The method according to claim 7, wherein step (a) is characterized by said band including in-phase and delayed path signals, and multiplying said in-phase and delayed path signals in compressing the band of said signals into a width of 70 Hz with a center frequency of 10.23 MHz.

9. The method according to claim 7, wherein step (b) includes transmitting said base-band together with other meteorological data via standard meteorological radio transmission.

10. The method according to claim 7, said reference oscillator being a 10.2298 MHz crystal oscillator.

11. The method according to claim 7, step (e) including the step of Fast Fourier Transform processing said digital representations to reproduce said spectral lines.

12. The method according to claim 10, said oscillator having an approximate predetermined oscillator frequency offset value, and step (g) including the step of determining the actual down conversion oscillator frequency offset value of said reference oscillator.

13. In apparatus for tracking a moving object at a processing station by intercepting wideband spread spectrum signals transmitted from a plurality of satellites in which the code sequence of said spread spectrum signals is not known, a receiver circuit in said moving object comprising:

(a) signal compressing means for compressing said wideband signals received from each said satellite into a narrow band including means for producing in-phase and delayed path signals from said spread spectrum signals, and said signal compressing means including means for multiplying said in-phase and delayed path signals whereby to compress said spread spectrum signals into a width of 70 Hz with a center frequency of 10.23 MHz;

(b) baseband means for forming a narrow analog baseband comprised of sine wave superpositions from said narrow band;

(c) reference oscillator means for removing any frequency bias present in said signal compressing means; and (d) means for transmitting said baseband from said receiver circuit after any frequency bias has been removed.

14. In apparatus according to claim 13, said multiplying means including an active mixer.

15. In apparatus according to claim 13, wherein a processing station includes means for processing said digital representations to produce spectral lines composed of amplitude, frequency and phase values.

16. In apparatus according to claim 15, said processing means including Fast Fourier Transform processing said digital representations to reproduce said spectral lines.

17. In apparatus according to claim 15, including means for generating a synthetic spectrum having a frequency offset value corresponding to the frequency offset value of said reference oscillator based on approximate location and velocity of said satellites.

18. In apparatus according to claim 17, including means for comparing said spectral lines with said digital synthetic spectrum values to determine the identity of each said satellite corresponding to each said spectral line, and means for estimating the reference oscillator frequency offset value and determining the location and velocity of each said moving object.

19. In apparatus for tracking the position of an airborne meteorological instrument from a processing station on the ground wherein said instrument transmits meteorological data to said processing station and said instrument includes a receiver circuit therein for intercepting wideband spread spectrum signals transmitted from a plurality of satellites passing above the horizon in which the code sequence of said spread spectrum signals is not known, the combination comprising:

said receiver circuit including signal compressing means for compressing the band of the signals received from each said satellite into a narrow band, baseband means for forming a narrow analog baseband comprised of sine wave superpositions from said narrow band, reference oscillator means for removing any frequency bias present in said compressing means including a reference oscillator whose stability is on the order of 10 ppm, means for transmitting said baseband from said receiver circuit after any frequency bias has been removed; and said processing station including means for receiving signals transmitted from said instrument including said meteorological data and said baseband, means for producing a digital representation of said sine wave superpositions in said baseband, means for processing said digital representations to produce spectral lines composed of amplitude, frequency and phase values, and means for estimating the frequency offset value of said reference oscillator to a precision on the order of 0.001 ppm in determining the location and velocity of said instrument.

20. In apparatus according to claim 16, wherein means are provided for generating a synthetic spectrum including a frequency offset value corresponding to the frequency offset value of said reference oscillator and converting to digital synthetic spectrum values representative of said spectrum, and means for comparing said spectral lines with said digital synthetic spectrum value to determine the identity of each said satellite corresponding to each said spectral line.

* * * * *

UNITED STATES PATENT AND TRADEMARK OFFICE
CERTIFICATE OF CORRECTION

PATENT NO.  :   5,347,285
DATED       :   13 September, 1994
INVENTOR(S) :   MacDoran, Peter F. et al It is certified that error appears in the above-identified patent and that said Letters Patent is hereby corrected as shown below:

On the title page item [75],

Cancel the existing listing in its entirety and substitute therefor:

-- Peter F. MacDoran, Boulder, Colorado; David B. Call,
   Boulder, Colorado; Kenneth L. Gold, Boone, Colorado;
   William S. Schreiner, Boulder, Colorado; and Fred A.
   Ziel, Boulder, Colorado --

Signed and Sealed this

Tenth Day of January, 1995

Attest:

BRUCE LEHMAN

Attesting Officer    Commissioner of Patents and Trademarks